US012388089B2

(12) United States Patent
Mitchell et al.

(10) Patent No.: US 12,388,089 B2
(45) Date of Patent: Aug. 12, 2025

(54) BATTERY ELECTRODE BINDER MATERIAL

(71) Applicant: 3M INNOVATIVE PROPERTIES COMPANY, St. Paul, MN (US)

(72) Inventors: Michael H Mitchell, Edina, MN (US); Michael C. Dadalas, Burghausen (DE); Mark W. Muggli, Emmerting (DE); Helmut Traunspurger, Julbach (DE); André Streiter, Muehldorf (DE); Kevin W. Eberman, St. Paul, MN (US); Brandon A. Bartling, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 18/462,577

(22) Filed: Sep. 7, 2023

(65) Prior Publication Data
US 2024/0113301 A1    Apr. 4, 2024

Related U.S. Application Data

(60) Provisional application No. 63/377,374, filed on Sep. 28, 2022.

(51) Int. Cl.
*H01M 4/62* (2006.01)
(52) U.S. Cl.
CPC .......... *H01M 4/625* (2013.01); *H01M 4/623* (2013.01)

(58) Field of Classification Search
CPC .......... H01M 4/623; H01M 4/625; H01B 1/24
USPC ......................................... 252/511
See application file for complete search history.

(56) References Cited

U.S. PATENT DOCUMENTS

| | | | | |
|---|---|---|---|---|
| 4,405,544 A | * | 9/1983 | Solomon | C25B 11/00 264/9 |
| 5,262,234 A | * | 11/1993 | Minor | D02G 3/441 428/375 |
| 6,818,695 B2 | | 11/2004 | Dillon et al. | |
| 10,676,591 B2 | | 6/2020 | Mitchell et al. | |
| 2010/0104845 A1 | * | 4/2010 | MacLennan | B01D 71/261 428/221 |
| 2015/0200402 A1 | * | 7/2015 | Yoshimoto | H01B 1/24 252/511 |

FOREIGN PATENT DOCUMENTS

WO    2017083076 A1    5/2017

OTHER PUBLICATIONS

Dadalas, Co-coagulation trials for Tesla binder material, 2021, 10 pages.

* cited by examiner

*Primary Examiner* — Khanh T Nguyen
(74) *Attorney, Agent, or Firm* — Julie Lapos-Kuchar; Thomas Spielbauer

(57) ABSTRACT

Methods of preparing a dry powder blend co-coagulating conductive carbon black particles and fibrillizable polytetrafluoroethylene particles from an aqueous dispersion and drying the co-coagulate are described. Dry powders prepared by such methods and electrodes prepared from such powders are also described.

15 Claims, No Drawings

BATTERY ELECTRODE BINDER MATERIAL

FIELD

The present disclosure relates to a co-coagulated blend of conductive carbon black particles and particles of a fibrillizable polytetrafluoroethylene. The resulting dry powder can be used as a binder to form battery electrodes enabling a solvent-free process.

SUMMARY

Briefly, in one aspect, the present disclosure provides a method of preparing a powder comprising forming a mixture by combining conductive carbon black particles having a D50 particle size of 10 to 150 nanometers with an aqueous latex comprising fibrillizable polytetrafluoroethylene particles having a D50 particle size of 40 to 200 nanometers, wherein a size ratio of the D50 particle size of the fibrillizable polytetrafluoroethylene particles to the D50 particle size of the carbon black particles is from 1.1:1 to 5:1, inclusive; co-coagulating the conductive carbon black particles and the fibrillizable polytetrafluoroethylene particles to form a co-coagulate; and drying the co-coagulate to form a powder blend comprising at least 90 wt. % of the conductive carbon black particles and the fibrillizable polytetrafluoroethylene particles, based on the total weight of the powder blend, wherein the powder blend comprises 15 to 45 wt. % of the conductive carbon black particles and 55 to 85 wt. % of the fibrillizable polytetrafluoroethylene particles.

In another aspect, the present disclosure provides a powder comprising at least 90 wt. % of a co-coagulated blend of conductive carbon black particles having a D50 particle size of 10 to 150 nanometers and fibrillizable polytetrafluoroethylene particles having a D50 particle size of 40 to 200 nanometers, wherein a ratio of weight of the fibrillizable polytetrafluoroethylene particles to weight of the conductive carbon black particles in the powder is from 1.1:1 to 5:1, inclusive.

DETAILED DESCRIPTION

The demand for batteries is increasing, particularly for use in electric vehicles. In addition to desires to reduce cost and increase production, there is a new focus on reducing the environmental impact of manufacturing batteries, while maintaining or improving productivity and performance.

Generally, a battery includes at least two electrodes, a cathode and anode, each electrically connected to its respective current collector. The cathode and anode may be separated by an electrolyte and a separator.

Generally, many different materials have been used for the anode, cathode, electrolyte and separator. The materials and structures of each component are selected to achieve the desired function of the particular component. The materials are also selected to be compatible with the other components and the overall structure of battery to achieve the desired performance Within these constraints, there is a new objective to identify materials that can be processed without the use of solvents, while maintaining or improving productivity and performance.

Materials comprising fluoropolymers blended with carbon particles have been used in various electronic applications. For example, U.S. Patent Publication 2006/0246343 A1 (Mitchell et al.) describes dry particle packaging systems for use in double-layer capacitors. The materials are prepared by dry-blending 50% to 99% activated carbon, 1% to 50% fibrillizable fluoropolymer binder, and optionally between 0% and 30% conductive carbon. Large particle sizes are employed, e.g., activated carbon particles having a mean diameter of about 10 microns, binder particles having a mean diameter of 450 microns, and conductive carbon particles having diameters less than 20 microns.

U.S. Patent Publication 2007/0008677 A1 (Zhong et al.) also describes a dry-blending process to prepare materials for a double-layer capacitor. The materials contain 85 to 92 percent by weight activated carbon particles blended with low amounts of conductive particles (0 to 10 weight percent, preferably no greater than 0.5 weight percent) and between 5 and 15 percent by weight of a fibrillizable binder such as PTFE. Ultracapacitor electrodes are also described in U.S. Patent Publication 2008/0201925 A1 (Zhong et al.). Again, the materials may be prepared by dry-blending high amounts of activated carbon with low amounts of binder (between about 3 and 20 percent by weight) and, optionally, conductive carbon (between 0 and 15 percent by weight, preferably not to exceed 0.5 percent by weight).

U.S. Pat. No. 10,676,591 B2 (Mitchell et al.) describes conductive compositions containing very high amounts of inorganic, electrically conductive particles combined with a melt-processible fluoropolymer. The compositions may be prepared by co-coagulating melt-processible fluoropolymer particles having a particle size of less than 500 nanometers with inorganic, electrically conductive particles having a particle size of less than 15,000 micrometers (preferably, 10 to 1500 micrometers). These compositions contain at least 1 weight percent (preferably 5 to 25 weight percent) of the fluoropolymer binder and at least 60 weight percent (preferably at least 70, at least 73 and, most preferably, at least 82 weight percent) of the inorganic, electrically-conductive particles.

Despite the availability of these and other technologies, there remains a need to identify compositions and methods of preparing compositions that meet specific application needs. For example, there remains a need for electrode (e.g., cathode and anode) materials containing high amounts of conductive carbon and binder. The present inventors discovered that suitable materials could be prepared by co-coagulating conductive particles and fibrillizable polytetrafluoroethylene particles if nano-scale particles of similar sizes were used. As a result, the present disclosure provides powders comprising conductive carbon black particles and particles of a fibrillizable polytetrafluoroethylene, methods of preparing them, and their use to form electrodes.

Conductive carbon black particles are well-known and available from a variety of sources including Cabot Corporation (e.g., those available under the trade names BLACK PEARLS, VULCAN and STERLING) and Imerys S. A. (e.g., those available under the trade names C-NERGY and SUPER P Li). In some embodiments, the conductive carbon black particles are spheroidal, i.e., the ratio of major axis to minor axis is no greater than 3, e.g., no greater than 2, no greater than 1.5, or even no greater than 1.2.

In prior compositions, relatively large conductive particles have been used, e.g., in some cases micron to millimeter size conductive particles have been used. In contrast, in the present invention, nanometer-sized conductive carbon particles are used. Generally, the D50 size of the conductive carbon particles is no greater than 150 nanometers (nm), e.g., e.g., no greater than 100 nm. In some embodiments, the D50 size of the conductive carbon particles is 10 to 150 nm, 10 to 100 nm, 20 to 80 nm, or even 20 to 60 nm, inclusive.

In the present compositions, conductive carbon particles are combined with particles of a fibrillizable polytetrafluororoethylene (PTFE). Generally, the term fibrillizable PTFE is well-known in the art and has been used interchangeably with terms such as fibrillating PTFE and fibrillatable PTFE. Generally, these terms refer to a PTFE that will from fine fibrils or tendrils when subjected to shear. Such PTFE polymers may comprise at least 99, or even at least 99.5, 99.9, or even 99.95 mole percent of TFE ($-CF_2-CF_2-$) repeat units. Fibrillizable PTFEs are generally non-melt processible, as they have a very low melt flow index. For example, in some embodiments, they may have a melt flow index of less than 0.05, e.g., less than 0.01 g per 10 minutes when measured at 372° C. using a 5 kg load (MFI 372/5).

Like the conductive carbon particles, the particles of the fibrillizable PTFE are nano-sized. Generally, the D50 size of the particles of PTFE is no greater than 200 nm, e.g., no greater than 110 nm, e.g., in some embodiments, 40 to 200 nm, 40 to 110 nm, 50 to 100 nm, or even 60 to 90 nm.

Generally, the conductive carbon particles and the particles of fibrillizable PTFE are of a similar size, although the PTFE particles are somewhat larger than the conductive carbon particles. Generally, the ratio of the D50 size of the particles of PTFE to the D50 size of the conductive carbon particles is greater than 1:1 and no greater than 5:1, e.g., 1.1:1 to 5:1. In some embodiments, this D50 size ratio is from 1.5:1 to 4:1, or even 2:1 to 4:1.

In addition to controlling the particles sizes and size ratio, the relative amounts of the conductive carbon particles and the particles of fibrillizable PTFE is important. While many prior art compositions include low amounts of a binder relative to inorganic fillers, the powders of the present disclosure contain greater than 50 percent by weight of the particles of fibrillizable In some embodiments, the powders contain at least 55, or even at least 60 wt. % of the particles of PTFE, based on the total weight of the composition. In some embodiments, the powders contain 55 to 85, e.g., 60 to 80 wt. % of the particles of fibrillizable PTFE.

The powders also contain higher loadings of the conductive carbon particles, i.e., at least 15 percent by weight based on the total weight of the composition. In some embodiments, the powders comprise 15 to 45 weight percent, e.g., 20 to 40 wt. % of the conductive carbon particles.

Although additional additives may be present, generally, the powders comprise at least 90 percent by weight, or even at least 95 wt. % of the conductive carbon black particles and particles of a fibrillizable polytetrafluoroethylene, with a higher proportion of PTFE than conductive carbon. Generally, the weight ratio of particles of PTFE to conductive carbon particles is at least 1.2:1, e.g., at least 2:1. Generally, the weight ratio of particles of PTFE to conductive carbon particles is no greater than 6:1, e.g., no greater than 5:1. In some embodiments, this weight ratio is from 1.2:1 to 5:1, e.g., 2:1 to 4:1, inclusive.

In addition to controlling the chemical composition and physical characteristics of the powder components, the present inventors discovered that the methods by which the powder is prepared also impacts the final properties. While many prior art processes rely on dry-blending, the present inventors discovered that this approach led to poor particle co-distributions Films formed from dry-blended compositions also showed poor mechanical strength when formed into finished products such as free-standing films. In addition, the shear forces generated during dry-blending, especially when trying to achieve a good co-distribution of particles, can lead to excessively high levels of fibrillation of the PTFE in the powder, which can complicate their use in forming subsequent products.

Generally, it is desirable to have a dry powder blend in which there is a good co-distribution of the conductive carbon particles and the fibrillizable PTFE particles. In addition, while in powder form, there should little or no fibrillization of the PTFE. Such powders provide improved handling prior to and during the formation of articles such as films in processes that then employ shear to achieve the desired level of PTFE fibrillation in the finished product.

Methods of preparing the powders of the present disclosure begin with an aqueous latex of fibrillizable PTFE particles. Aqueous emulsion polymerization is known to be useful for forming the desired nanometer sized particles of PTFE. Such polymerization is performed in water with surfactant. As explained in, e.g., "Emulsion polymerization of tetrafluoroethylene: effects of reaction conditions on particle formation" (Journal of Fluorine Chemistry 96 (1999) pp. 11-21), the size of the PTFE particles can be controlled by selection of the surfactant and its concentration, as well as the agitation speed. Generally, the particle sizes are less than 500 nm, e.g., less than 400 or even less than 200 nm. In addition, particles as small as 20 to 200 nm may be formed. In some embodiments, the emulsion polymerization conditions are controlled to achieve particles of a fibrillizable PTFE having a D50 particle size of no greater than 110 nm, e.g., in some embodiments, 40 to 110 nm, 50 to 100 nm, or even 60 to 90 nm.

The aqueous latex of fibrillizable PTFE particles may be adjusted to achieve an aqueous latex having the desired concentration, pH and surface tension for subsequent steps. In some embodiments, the aqueous latex is adjusted to provide a composition containing 1 to wt. %, e.g., 5 to 10 wt. % of the fibrillizable PTFE particles based on the total weight of the composition. In some embodiments, the composition may be diluted with water, which may optionally contain additives to also adjust the pH or the surface tension. In some embodiments, a diluted composition may contain 1 to 5 wt. % of the fibrillizable PTFE particles.

In some embodiments, separately or simultaneously with the dilution, the pH of the aqueous latex may be adjusted to a pH of 4 to 6, inclusive. Although not critical, in some embodiments, carboxylic acids such as octanoic and formic acid may be used to adjust the pH.

In some embodiments, separately or simultaneously with the dilution or pH adjustment, the surface tension of the aqueous latex may be adjusted to improve the wettability of the carbon black with the aqueous solution. In some embodiments, the surface tension may be adjusted to less than 40, e.g., less than 30 mN/m, e.g., from 15 to 30, e.g., 19 to 21 mN/m. Surfactants such as those available from Momentive Performance Materials under the trade name SILWET (e.g., SILWET L77) may be used.

Conductive carbon black particles may be added to the aqueous latex of fibrillatable PTFE having the desired concentration, pH, and surface energy. The amount of carbon black can be adjusted based on the wt. % of the PTFE particles in the aqueous latex to achieve the desired weight ratio. The resulting mixture is processed to provide a co-dispersion of the particles. In some embodiments, the mixture is homogenized to further ensure a good dispersion.

Alternatively, to improve the homogeneity of the carbon black, a masterbatch may be prepared. For example, the conductive carbon black may be prepared at higher concentrations in an aqueous solution of the desired surface tension. This solution may then be processed (e.g., high-shear mixed) to provide a master batch of conductive carbon black dispersed in the aqueous solution with a high degree of homogeneity. This master batch may then be used to introduce the conductive carbon black particles to the aqueous latex of fibrillatable PTFE.

Regardless of how it is prepared, the resulting dispersion is co-coagulated, i.e., the particles of PTFE are coagulated in the presence of the well-dispersed conductive carbon black particles resulting in a co-coagulation of both particles. Generally, any known methods may be used to coagulate, including e.g., high-shear mixing, the addition of an acid, base or salt, or freeze coagulation.

The resulting co-coagulate can then be dried to provide a powder. In some embodiments, the powder comprises a combined weight of at least 90, e.g., at least 95% of the conductive carbon black particles and the fibrillatable PTFE particles.

Examples. The following examples illustrate various methods and powders produced in the present invention as well as comparative methods and samples. The materials used are summarized in Table 1.

TABLE 1

Summary of materials used in the preparation of the examples.

| Description | Trade Name and Source |
|---|---|
| Conductive Carbon black, 40 nm (a) | EQ-lib-Super P from MTI Corp. |
| Surfactant | SILWET L77 from Momentive Performance Materials |
| Coagulation aid | MAGNAFLOC 90L from BTC Europe Chemicals |
| Fibrillizable PTFE particle dispersion, 195 nm particles (b) | DYNEON PTFE TF 5033Z from 3M Company |
| Non-Fibrillizable PTFE particle dispersion, 190 nm particles (b) | DYNEON PTFE TF 5135LZ from 3M Company |
| Fibrillizable PTFE particle dispersion, 72 nm particles (c) | F-PTFE-72, prepared as described herein |
| Fibrillizable PTFE particle dispersion, 192 nm particles (c) | F-PTFE-192, prepared as described herein |

(a) reported value said to be measured by Transmission Electron Microscopy
(b) reported value measured according to DIN-ISO 13321: 1996
(c) value measured according to DIN-ISO 13321: 1996

Preparation of F-PTFE-72. PTFE particles were prepared as follows.

A 50-L vertical kettle equipped with an anchor agitator and baffle was charged with approximately 28 L of deionized water and 0.5 kg of an approximate 10% by weight solution of a seed latex comprising TFE and having an average particle D50 size of 90+/−5 nm and then heated to 35° C. The seed latex comprising TFE was prepared according to U.S. Pat. No. 4,391,940 (Kuhls et al.) using a 110 g of a 30% solution of $(CF_3O(CF_2)_3OCHFCF_2C(O)ONH_4$, prepared as described in U.S. Pat No. 7,671,112 (Hintzer et al.) as compound 2, treated according to U.S. Pat No. 11,072,671 example 8. The kettle was evacuated repeatedly to remove oxygen, the kettle was then pressurized with tetrafluoroethylene (TFE) monomer to 1.5 MPa, the agitation was set to 120 revolutions per minute (rpm) and respective 50 mL solutions of 0.13 g sodium bisulfite and 0.32 g of ammonium persulfate were metered in.

A pressure drop indicated the start of the polymerization reaction. Between 2 to 4 kg of TFE, were continuously fed to the polymerization such that the required polymerization pressure was maintained. After the desired amount of TFE had been fed, 7.9% solids, the polymerization reaction was stopped by shutting the monomer valve and releasing the pressure.

After the polymerization of the PTFE, the PTFE latex comprised PTFE particles (i.e., primary particles) in an aqueous solution. The PTFE latex was deliberately coagulated and dried as follows. The PTFE latex (1000 mL) was diluted with deionized water (1000 mL) and coagulated by adding 418 mg of oxalic acid×2 $H_2O$ under vigorous agitation. The coagulated PTFE was washed with 3 L deionized water and then dried at 175° C. for 12 hours to obtain 72 nm particles.

Preparation of F-PTFE-192. PTFE particles were prepared according to Process A in U.S. Pat. No. 11,072,671, as follows.

A 40-L vertical kettle equipped with an anchor agitator and baffle was charged with approximately 23.5 L of deionized water and 0.5 kg of an approximately 10% by weight solution of a seed latex comprising TFE and having an average particle D50 size of 90+/−5 nm and then heated to 30° C. The seed latex comprising TFE and 0.3% hexafluoropropylene was prepared according to U.S. Pat. No. 4,391,940 (Kuhls et al.) using a 70 g of a 30 wt. % solution of $(CF_3O(CF_2)_3OCHFCF_2C(O)ONH_4$, prepared as described in U.S. Pat No. 7,671,112 (Hintzer et al.) as compound 2. The kettle was evacuated repeatedly to remove oxygen and the kettle was then pressurized with tetrafluoroethylene (TFE) monomer to 1.5 MPa, the agitation was set to 147 revolutions per minute (rpm) and 1.31 g of oxalic acid×2 $H_2O$ was added. The reaction was initiated with an aqueous solution of potassium permanganate (initiator).

A pressure drop indicated the start of the polymerization reaction. Between 7 to 8 kg of TFE, were continuously fed to the polymerization such that the required polymerization pressure was maintained. After the desired amount of TFE had been fed, 22 wt. % solids, the polymerization reaction was stopped by shutting the monomer valve and releasing the pressure.

After the polymerization of the PTFE, the PTFE latex comprised PTFE particles (i.e., primary particles) in an aqueous solution. The PTFE latex was deliberately coagulated and dried as follows. The PTFE latex (1000 mL) was diluted with deionized water (1000 mL) and coagulated by adding 418 mg of oxalic acid×2 $H_2O$ under vigorous agitation. The coagulated PTFE was washed with 3 L deionized water and then dried at 175° C. for 12 hours to obtain 192 nm particles.

Samples 1 and 2: Adding conductive carbon black to an aqueous PTFE dispersion.

Sample 1: Fibrillizable PTFE. To create a 2.5% solids dispersion, 2150 grams of de-ionized water were charged into a 5 L beaker and mixed with 0.12% of SILWET L77 surfactant (2.5 g) to reduce the surface tension from 71.5 mN/m to 20.6 mN/m. At this point, 241 grams of a 24.9% solids dispersion of 195 nm fibrillizable PTFE particles (PTFE TF5033Z) were added. The pH was then adjusted to 5 using 20% formic acid and the dispersion was homogenized for 10 minutes. Next, 20 grams of the conductive carbon black particles were added, and the mixture was stirred for up to 10 minutes with an IKA Eurostar digital stirrer and paddle stirrer. Finally, 10 grams of 1% MAGNAFLOC 90 L coagulant was added to the mixture and stirred for 20 minutes before allowing the mixture to settle at which point a clear phase separation was observed. The clear water showed a residual solid content of 0.04%. The co-coagulated mixture was washed three times, each wash using 2000 grams of deionized water then stirred at 400 rpm for 1 minute. The resulting co-coagulated mixture of 75 wt. % fibrillizable PTFE particles and 25 wt. % conductive carbon black particles was separated from the aqueous phase and dried at 140° C. for 16 hours to form a co-coagulated powder.

Sample 2: Non-Fibrillizable PTFE. Sample 2 was prepared in the same manner as Sample 1, except that 250 grams of a 24.0 wt. % solids dispersion of 190 nm non-fibrillizable PTFE particles (TF 5135LZ) dispersion were used. After phase separation, the clear water had a residual solid content of 0.28%. After washing, the resulting co-coagulated mixture of 75% non-fibrillizable PTFE particles and 25% conductive carbon black particles was separated from the aqueous phase and dried at 140° C. for 16 hours to form a co-coagulated powder.

Pucks with a diameter of 80 mm and a thickness of 2 mm were prepared from each of Samples 1 and 2. For each sample, 16 g of the co-coagulated conductive carbon black/PTFE powder was added to an 80 mm diameter mold, then loaded into a press at 25° C. and pressed at 35 MPa for 5 minutes. The puck was then heated to 380° C. at 120° C./hour and held for 30 minutes at 380° C. The puck was then cooled to 294° C. at 60° C./hour followed by a ramp down to 25° C. to form the final pucks.

The electroconductivity of the pucks was measured using a LORESTA AP MCP-T400 low resistivity meter and an ESP four-point probe from Mitsubishi Chemical. The four probes were arranged in a straight line 5 millimeters apart. A current (I) was applied between the two outer probes and the drop in voltage (V) was measured between the two inner probes. The volume resistivity ($p_v$) was then calculated according to the following formula where t is the thickness of the sample and RCF is the Resistivity Correction Factor, which depends on the shape and size of the sample, as well as the positions of the probes. The results are summarized in Table 2.

$$\rho_v = RCF\left[\frac{t \times V}{I}\right]$$

As shown, the sample prepared with the fibrillizable PTFE had a significantly higher electroconductivity as compared to the sample prepared with the non-fibrillizable PTFE despite having the same ratio of PTFE particles to conductive carbon black particles.

TABLE 2

Electroconductivity of Samples 1 and 2.

| Sample | Electroconductivity | Example |
|---|---|---|
| 1 | 2.62 S/cm | EX-1 |
| 2 | 1.41 S/cm | CE-1 |

Sample 3 (CE-2): Dry blending conductive carbon black and fibrillizable PTFE particles.

A fibrillizable PTFE dispersion (F-PTFE-72) was coagulated and dried to prepare a powder of the 72 nm PTFE particles. Sample 3 was prepared by combining 75 g of this dry fibrillizable PTFE powder with 25 g of the conductive carbon black particles. This dry powder mixture was homogenized with a gyro wheel mixer at 15° C. for one hour. Attempts to press this sample into pucks were not successful due to crumbling during puck production process.

Samples 4 and 5: Mixing aqueous dispersions of conductive carbon black particles and fibrillizable PTFE particles.

A master batch of the conductive carbon black particles was prepared using 3 liters of deionized water containing 0.12 wt. % of the SILWET L77 surfactant. Into this mixture, 40 g of conductive carbon black particles were added and stirred with a TURRAX mixer at 13000 rpm for 10 minutes. Next, this mixture was added into a Dyno-Mill (Manufactured from WAB-Willy A. Bachofen AG Maschinenfabrik) and mixed at 3500 rpm for 5 minutes to generate an a homogenous masterbatch of the conductive carbon black particles.

Sample 4 was prepared from 184.0 g of a 24.5 wt. % aqueous dispersion of fibrillizable PTFE particles with a D50 primary particle size of 192 nm (F-PTFE-192). This sample was diluted with deionized water to a solids content of 2.5 wt. %. Into this diluted mixture, 0.12% of SILWET L77 surfactant (calc. on water) was added to reduce the surface tension and improve wettability.

This diluted mixture was combined with 555 g of the conductive carbon black masterbatch and homogenized by stirring for 2 minutes at 200 rpm. Then, 0.16 wt. % MAGNAFLOC 90 L coagulant (1% solution in water, calc. on PTFE solids) was added into the homogenized mixture and stirred for 10 minutes at 800 rpm. The resulting mixture was allowed to build phase separated phases. The co-coagulated phase of conductive carbon black particles and fibrillizable PTFE particles was isolated and washed three times with deionized water and dried for 20 hours at 200° C. to form a co-coagulated powder.

Sample 5 was prepared from 736.7 g of a 7.9 wt. % aqueous dispersion of fibrillizable PTFE particles with a D50 primary particle size of 72 nm (F-PTFE-72). This sample was diluted with deionized water to an solids content of 2.5 wt. %. Into this diluted mixture, 0.12% of SILWET L77 surfactant (calc. on water) was added to reduce the surface tension and improve wettability.

This diluted mixture was combined with 718 g of the conductive carbon black masterbatch and homogenized by stirring for 2 minutes at 200 rpm. Then, 0.17 wt. % MAGNAFLOC 90 L coagulant (1% solution in water, calc. on PTFE solids) was added into the homogenized mixture and stirred for 10 minutes at 800 rpm. The resulting mixture was allowed to build phase separated phases. The co-coagulated phase of conductive carbon black particles and fibrillizable PTFE particles was isolated and washed three times with deionized water and dried for 20 hours at 200° C. to form a co-coagulated powder.

Pucks with a diameter of 80 mm and a thickness of 2 mm were prepared as described above. Pucks with a diameter of 40 mm and a thickness of 1.5 mm were prepared from each of Samples 4, 5 and 6. For each sample, 4 g of the co-coagulated conductive carbon black/PTFE powder was added to a 40 mm diameter mold then loaded into a press at 25° C. and pressed at 35 MPa for 5 minutes.

Dumbbell specimens were cut out from 80 mm pucks. Tensile strength and elongation to break were measured in accordance with DIN EN ISO 527-1, using a ZWICKI Z 2.5 material testing machine from ZwickRoell LP. The electroconductivities of the 40 mm pucks of Samples 5 and 6 were also measured. No results could be obtained for Sample 4 (dry blend) as a stable puck that did not crumble could not be prepared. The results are shown in Table 3.

TABLE 3

Mechanical properties of Samples 4-6.

| Sample | Tear Strength | Elongation at break | Electroconductivity | Example |
|---|---|---|---|---|
| 3 | N/A | N/A | N/A | CE-2 |
| 4 | 3.6 MPa | 5.1% | 1.53 S/cm | EX-2 |
| 5 | 11.6 MPa | 15.8% | 1.21 S/cm | EX-3 |

What is claimed is:

1. A method of preparing a powder comprising
forming a mixture by combining conductive carbon black particles having a D50 particle size of 10 to 150 nanometers with an aqueous latex comprising fibrillizable polytetrafluoroethylene particles having a D50 particle size of 40 to 200 nanometers, wherein a size ratio of the D50 particle size of the fibrillizable polytetrafluoroethylene particles to the D50 particle size of the carbon black particles is from 1.1:1 to 5:1, inclusive;
co-coagulating the conductive carbon black particles and the fibrillizable polytetrafluoroethylene particles to form a co-coagulate; and
drying the co-coagulate to form a powder blend comprising at least 90 wt. % of the conductive carbon black particles and the fibrillizable polytetrafluoroethylene particles, based on the total weight of the powder blend, wherein the powder blend comprises 15 to 45 wt. % of the conductive carbon black particles and 55 to 85 wt. % of the fibrillizable polytetrafluoroethylene particles.

2. The method of claim 1, further comprising homogenizing the mixture prior to co-coagulating the conductive carbon black particles and the fibrillizable polytetrafluoroethylene particles.

3. The method of claim 1, wherein a ratio of weight of the fibrillizable polytetrafluoroethylene particles to weight of the conductive carbon black particles in the powder is from 2:1 to 4:1.

4. The method of claim 3, wherein the aqueous latex has a pH of 4 to 6 and a surface tension of 15 to 30 mN/m.

5. The method of claim 1, wherein the conductive carbon black particles have a D50 particle size of 20 to 60 nanometers.

6. The method of claim 5, wherein the fibrillizable polytetrafluoroethylene particles have a D50 particle size of 60 to 90 nanometers.

7. The method of claim 1, wherein the mixture is formed by combining an aqueous dispersion of the conductive carbon black particles with the aqueous latex comprising the fibrillizable polytetrafluoroethylene particles.

8. A powder made the method of claim 1.

9. A powder comprising at least 90 wt. % of a co-coagulated blend of conductive carbon black particles having a D50 particle size of 10 to 150 nanometers and fibrillizable polytetrafluoroethylene particles having a D50 particle size of 40 to 200 nanometers, wherein a ratio of weight of the fibrillizable polytetrafluoroethylene particles to weight of the conductive carbon black particles in the powder is from 1.1:1 to 5:1, inclusive.

10. The powder of claim 9, comprising 20 to 40 wt. % of the conductive carbon black particles and 60 to 80 wt. % of the fibrillizable polytetrafluoroethylene particles.

11. The powder of claim 9, wherein the conductive carbon black particles have a D50 particle size of 20 to 60 nanometers and the fibrillizable polytetrafluoroethylene particles have a D50 particle size of 60 to 90 nanometers.

12. The powder of claim 9, wherein a size ratio of the D50 particle size of the fibrillizable polytetrafluoroethylene particles to the D50 particle size of the carbon black particles is from 2:1 to 4:1, inclusive.

13. A powder of claim 9 further comprising a thermally conductive filler, optionally wherein the thermally conductive filler is selected from the group consisting of boron nitride, aluminum oxide, and combinations thereof.

14. A method of preparing an electrode comprising spreading the powder of claim 9 on a support and fibrillating the fibrillizable polytetrafluoroethylene particles.

15. An electrode prepared by the method of claim 14.

* * * * *